Feb. 12, 1957 C. J. SHERMAN 2,781,038
COOKING BURNER CONTROL AND THERMOSTAT
Filed April 10, 1953 2 Sheets-Sheet 1
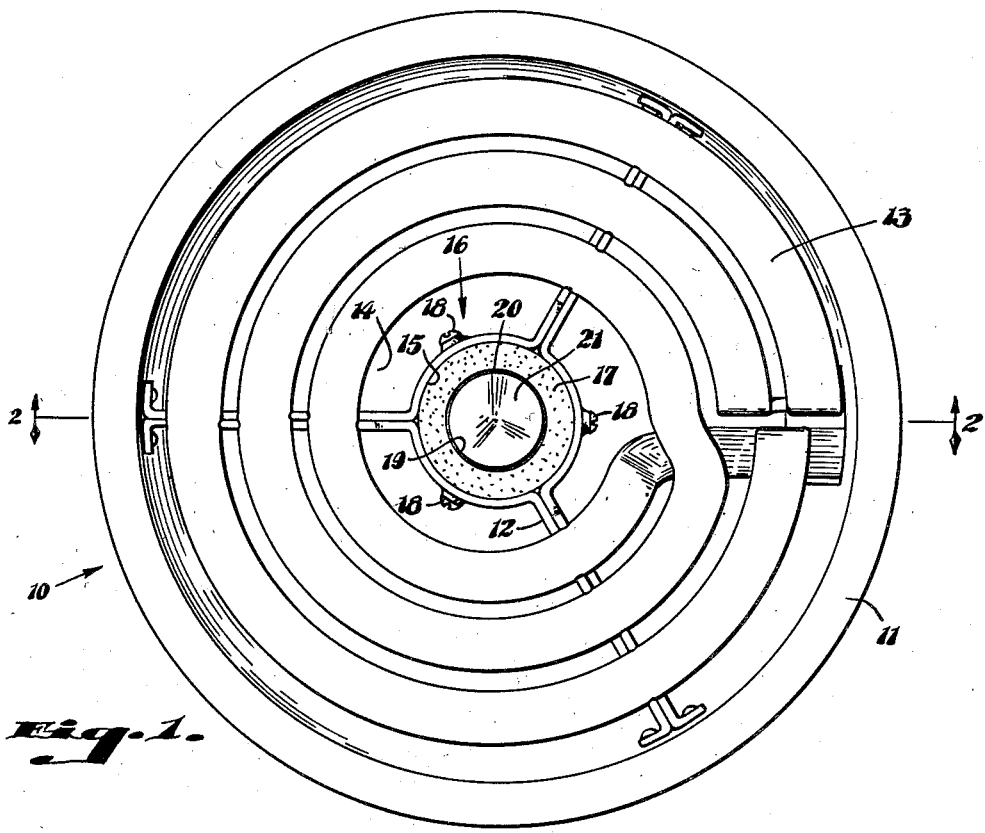
Fig. 1.
Fig. 2.
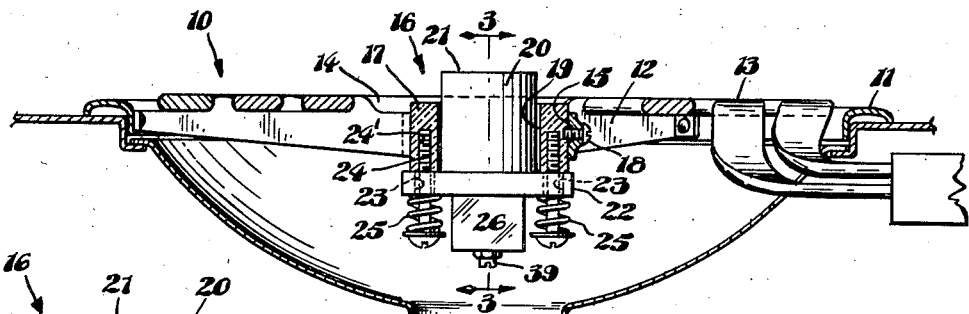
Fig. 3.
INVENTOR.
CARROLL J. SHERMAN,
BY Harold B. Hood
ATTORNEY.

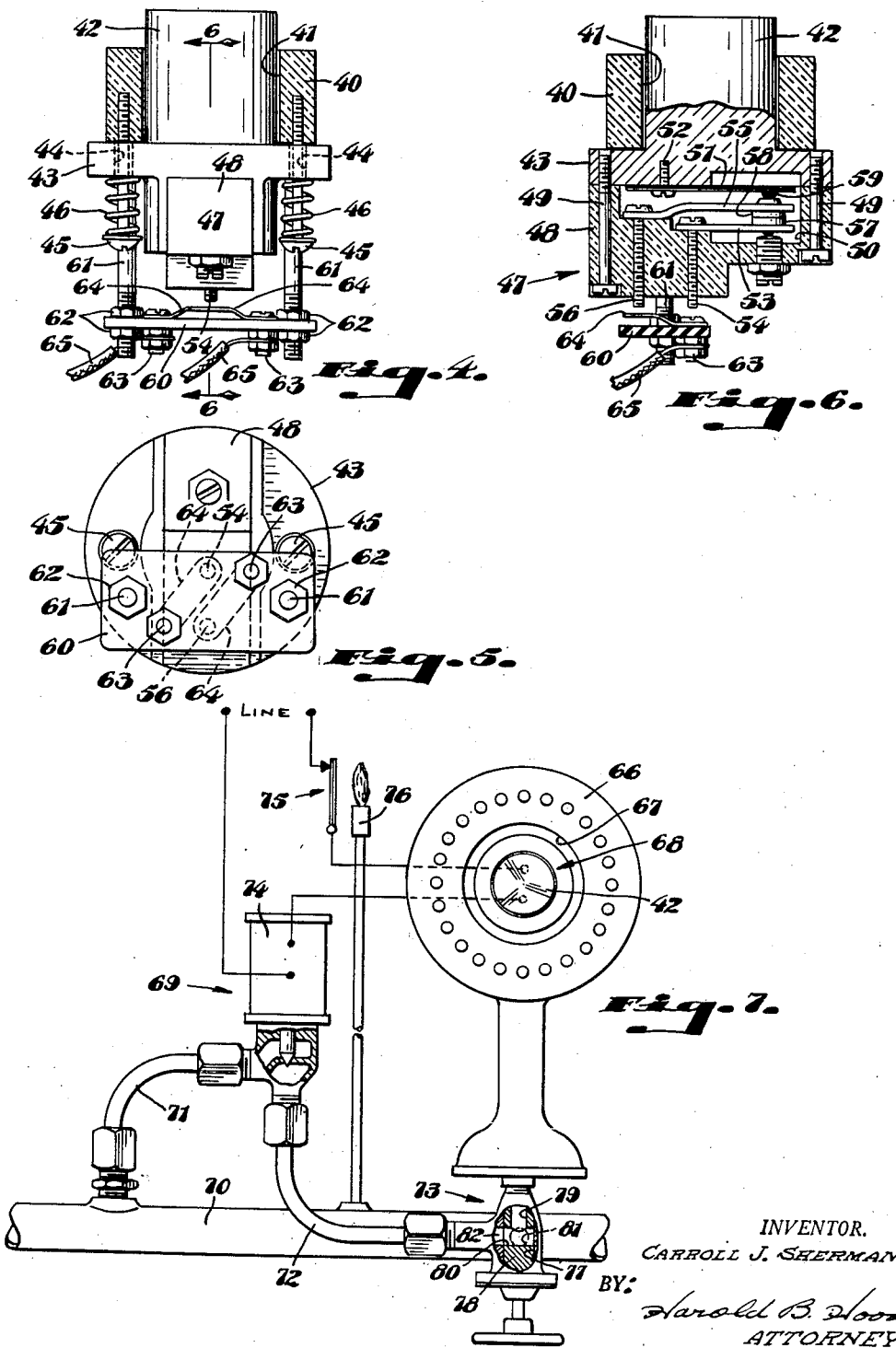

United States Patent Office 2,781,038
Patented Feb. 12, 1957

2,781,038

COOKING BURNER CONTROL AND THERMOSTAT

Carroll J. Sherman, Indianapolis, Ind.

Application April 10, 1953, Serial No. 347,866

6 Claims. (Cl. 126—52)

The present invention relates to a cooking device and particularly to a means for controlling the activation of the heating unit of such a device, such means being responsive primarily to the temperature of a utensil being heated thereon.

The primary object of this invention is to provide a simple, inexpensive, yet highly efficient control of this type which can be adapted, with equal facility, to either an electric or gas type cooking device.

A further object is to provide such a control more completely thermally insulated from the heat of the heating element itself than have been devices of this type heretofore known, whereby the control will be placed more positively under domination of the temperature of the utensil.

A still further object is to provide a novel means for mounting the control whereby the heating unit, either gas or electric, will be placed in operation by the mere placing of a utensil on the heating element.

Another object is to provide a simplified bi-metal thermostatic switch for such a control, so constructed and mounted as to be placed almost entirely under the influence of the temperature of the utensil.

Further objects will become apparent as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a plan view of a more or less conventional type of heating element showing the basic form of my invention associated therewith;

Fig. 2 is a transverse sectional view through the element of Fig. 1 substantially on line 2—2 thereof;

Fig. 3 is a longitudinal sectional view on an enlarged scale of my control mechanism taken substantially on line 3—3 of Fig. 2;

Fig. 4 is a side elevation of a modified form of the control unit of Fig. 3;

Fig. 5 is a bottom plan view of the unit of Fig. 4;

Fig. 6 is a longitudinal sectional view of the modified form of control taken substantially on line 6—6 of Fig. 4; and Fig. 7 is a more or less diagrammatic view showing the manner in which my control can be used in connection with a gas type cooking device.

Referring more particularly to the drawings, and specifically to Figs. 1 to 3, it will be seen that I have illustrated my control in connection with a more or less conventional electric heating unit referred to generally by the reference numeral 10. Such unit comprises a rim member 11 supporting a spider 12 on which is supported, in whole or in part, an electric resistance-type heater coil 13.

Such heater elements are conventionally provided with a central opening 14 and, for the purpose of this invention, I provide an aperture 15 in the spider 12 in registry with opening 14. My control mechanism, referred to generally by the reference numeral 16, is received and supported in aperture 15 in a manner now to be described.

Snugly received in aperture 15 is a ring 17 preferably formed of any of a number of types of relatively low, thermo-conductive material such as porcelain, asbestos, or similar materials. While materials of higher thermo-conductivity can be used, their use lessens, somewhat, the accuracy of the control and for this reason, those materials first mentioned are most desirable. Set-screws 18, or the like, are provided to retain ring 17 in aperture 15. This ring has a central bore 19 in which is reciprocably received a plug 20, formed of any of a number of types of materials of relatively high thermo-conductivity, such as copper, aluminum, or the like.

Plug 20 is so movable that end 21 thereof will assume a position above the plane of the upper surface of element 13, as illustrated, and a position in which said end will lie substantially in the said plane when a utensil is placed on element 13.

Plug 20 is provided, on the end thereof remote from end 21, with a radially projecting, annular flange portion 22 underlying the ring member 17. Said flange is provided with a plurality of spaced apertures 23, and a plurality of headed screws or pins 24 are passed through these apertures and take into suitable bores 24' in ring 17. A coiled spring 25 is provided for each pin 24 and is sleeved thereon and confined between the pin head and the flange portion 22 to urge plug 20 toward its illustrated position.

A thermo-responsive switch, referred to generally by the reference numeral 26, is fixed to plug 20 in a manner now to be described. A block 27 is formed of any of a number of types of electrically non-conductive materials and is fixed to plug 20 by means of screws 28, or the like, taking into suitable bores in the flange 22. This block is formed with a cavity 29 therein. Within this cavity, a bi-metal leaf 30 is fixed directly to plug 20 by means of a screw 31, whereby heat from the utensil will be conducted through plug 20 directly to leaf 30 causing the free end of the leaf to swing in a plane substantially normal to the plane of element 13.

A first spring leaf 32 is fixed to block 27 by means of a screw 33, and a second spring leaf 34 is fixed to the block by means of a screw 35. Screws 33 and 35 serve as electric terminals for the switch.

Leaves 32 and 34 are respectively provided at their free ends with electrical contacts 36 and 37. Leaf 34 is biased to move contact 37 away from contact 36 and into engagement with the free swinging end of the bi-metal leaf 30. An insulating button 38 is provided on leaf 30 to prevent electrical contact between leaves 30 and 34.

Thus, it will be seen that, as the plug 20 becomes heated, leaf 30 will flex to move its free end upward, as viewed in Fig. 3, thereby permitting contact 37 to move out of engagement with contact 36. Of course, the control circuit for element 13 is wired through contacts 36 and 37 by way of screws 33 and 35, and, when the contacts open, as stated, element 13 will be deenergized. Upon cooling of plug 20, leaf 30 will flex downward closing contacts 36 and 37.

In order to control the temperature at which the contacts 36 and 37 will be opened and closed, I provide an adjustment screw 39 for moving contact 36 toward or away from contact 37.

As thus far described, the control will work quite satisfactorily but, since each time the plug 20 is moved up and down in ring 17, the conductors connected to terminal screws 33 and 35 will flex, after a period of time, these conductors will sometimes break due to such flexing. To overcome this difficulty and to provide an arrangement whereby the burner will be automatically deactivated upon the removal of the utensil from the burner, I provide the structure illustrated in Figs. 4–6.

The supporting ring 40, similar to ring 17, has a central bore 41 in which is reciprocably received a plug 42, similar to plug 20. Plug 42 is provided with a radially projecting, annular flange portion 43 underlying the ring 40. Said flange is provided with a plurality of spaced apertures 44, and a plurality of headed screws or pins 45 are passed through these apertures and take into suitable bores in ring 40. A coiled spring 46 is provided for each pin 45 and is sleeved thereon and confined between the pin head and the flange portion 43 to urge plug 42 toward its illustrated position.

A thermo-responsive switch, referred to generally by the reference numeral 47, is fixed to plug 42 in a manner now to be described. A block 48, similar to block 27, is fixed to plug 40 by means of screws 49, or the like, taking into suitable bores in flange 43. This block is formed with a cavity 50 therein. Within this cavity, a bi-metal leaf 51 is fixed directly to plug 42, by means of a screw 52, whereby heat from the utensil will be conducted through plug 42 directly to leaf 51 causing the free end of the leaf to swing in a plane substantially normal to the plane of element 13.

A first spring leaf 53 is fixed to block 48 by means of a screw 54, and a second spring leaf 55 is fixed to the block by means of a screw 56. An end of each of the screws 54 and 56 protrudes outside the bounds of block 48 to serve as an electrical contact in a manner soon to become apparent.

Leaves 53 and 55 are respectively provided at their free ends with electrical contacts 57 and 58. Leaf 55 is biased to move contact 58 away from contact 57 and into engagement with the free swinging end of the bi-metal leaf 51. An insulating button 59 is provided on leaf 51 to prevent electrical contact between leaves 51 and 55.

Spaced beneath the block 48, a terminal plate 60 is supported from ring 40 by means of posts 61, 61. In order to provide for adjustment of plate 60 toward and away from block 48, I prefer to thread the ends of posts 61 and confine the terminal plate between a pair of nuts 62, 62 threadedly carried on each post 61.

Plate 60 is provided with a pair of electrical terminal posts 63, 63 each supporting a spring leaf contact 64 located beneath one of the terminal screws 54 and 56 carried by block 48. The control circuit for the heating element is wired through terminals 63, 63. When a utensil is placed on the burner depressing plug 42, as before described, screw terminals 54 and 56 will be moved into engagement with the spring leaf contacts 64, 64 thereby closing the control circuit through contacts 57 and 58. Removal of the utensil will, of course, break this control circuit.

By this arrangement, it will be seen that the undesirable flexing of the conductors 65, 65 upon every movement of plug 42 is thereby eliminated, and additionally, since the removal of the utensil from the burner will permit plug 42 to move up thus breaking the circuit through contacts 54, 64 and 56, 64, the burner will be energized only when a utensil is in place on the burner. Need for a separate switch for this purpose is thereby eliminated and, in addition, a saving of fuel is had since the burner will be automatically deactivated when not in use.

As stated in the beginning, my control is equally adaptable for either an electric or gas type burner. In the case of the former, the control circuit can be wired directly through my control device. In the case of the gas burner, however, it is necessary to provide an electrically actuated valve for controlling the flow of gas to the burner.

In Fig. 7, I have shown one such arrangement which I presently believe to be optimum for this purpose. A conventional gas burner 66 has a central aperture 67 in which my control unit 68 is positioned much in the same manner as illustrated in the case of an electric heating element. An electrically actuated gas valve 69 has the inlet side connected to a gas manifold 70 through conduit 71, and the outlet side connected through conduit 72 and a control valve 73 to the burner 66. The coil of the solenoid 74 of valve 69 is electrically connected in series with the control unit 68. For safety purposes, I prefer to provide a thermo-actuated switch 75 in series with the coil of the solenoid 74 and unit 68 to be opened in case the gas pilot becomes extinguished.

When a utensil is placed on burner 66, plug 42 will be depressed closing the circuit through solenoid 74 and opening valve 69 to deliver gas to burner 66. Removal of the utensil will break this circuit stopping this flow of gas. Of course, when the temperature of the utensil reaches a predetermined high, the circuit will be broken by the opening of contacts 57 and 58 as described above.

In order that burner 66 can be taken out of the control of the control unit 68, I prefer to provide the by-pass valve 73. As shown, this valve is provided with a central bore 77 in which is oscillably received the movable portion 78. This portion has an axial passage 79 communicating with burner 66 at all times, and a transaxial bore 80 intersecting with passage 79. In addition to the connection of valve 73 with the gas manifold 70 through valve 69, valve 73 has a further and direct connection with the manifold through port 81, 90° removed from the port 82 leading to conduit 72. In the illustrated position of valve 73, gas can flow only through port 82, bore 80, and passage 79 to burner 66. Upon 90° rotation of portion 78, this path is blocked and a path from manifold 70 through port 81, bore 80 and passage 79 is established. This eliminates the control of the gas flow by control 68 and changes it to a manual operation.

By the use of this invention, the thermostatic switch of my control is placed more completely under the domination of the temperature of a vessel resting on element 13 or burner 66 than has been heretofore possible. By means of the solid, heat conducting plug directly in contact with the utensil bottom, and the bi-metal leaf fixed directly to such plug, quick, accurate, and dependable control of the utensil temperature becomes possible.

Additionally, automatic activation of a burner, either electric or gas, becomes possible; a thing not heretofore possible in controls of this type.

I claim as my invention:

1. In combination with a heating device which is formed to provide a vessel-supporting surface having an opening therethrough, an electric circuit dominating the delivery of heat from said heating device, and means for controlling said circuit comprising a tubular member of relatively low thermo-conductive material, means for supporting said member in the opening through the vessel-supporting surface of such a heating device with the open, upper end of said member disposed substantially in the plane of the vessel-supporting surface thereof, a plug of relatively high thermo-conductive material reciprocably received in, and largely shielded by, said tubular member, the lower end of said plug being provided with a radially-projecting annular portion underlying the lower end of said tubular member and having a plurality of spaced passages therethrough, a plurality of headed pins supported from said tubular member upon spaced axes substantially parallel to the axis of said tubular member and passing through the passages in said annular portion, a coiled spring sleeved on each of said pins and confined between the head thereof and said annular plug portion to urge said plug yieldingly toward upward projection beyond the open, upper end of said tubular member, a bi-metal leaf fixed at one end directly to the lower end of said plug and with its other end free to move relative to said plug in response to temperature changes thereof, a block of electrical insulating material fixed to said annular plug portion, a first spring leaf fixed at one end to said block with the other end thereof biased into engagement with said other end of said bi-metal leaf for movement therewith, a first electrical contact provided near said other end of said first spring leaf, a second spring leaf fixed at one end to said block with the other end thereof disposed in the path of movement of said other end of said first spring leaf, a second electrical contact provided near said other end of said second spring leaf and adapted for engagement by said first contact upon movement of said other end of said bi-metal leaf in one direction relative to said plug, and means for electrically connecting said first and second spring leaves in such an electric circuit, and a set screw threadedly supported in said block and engageable at one end with said other end of said second spring leaf for adjustment of said second contact toward and away from said first contact, said second spring leaf being biased toward continuous engagement with said one end of said set screw.

2. In combination with a heating device which is formed to provide a vessel-supporting surface having an opening therethrough, an electric circuit dominating the delivery of heat from said heating device, and means for controlling said circuit comprising a tubular member formed of relatively low thermo-conductive material, means for supporting said member in the opening through the vessel-supporting of such a heating device with the open, upper end of said member disposed substantially in the plane of the vessel-supporting surface thereof, a plug of relatively high thermo-conductive material reciprocably received in, and largely shielded by, said tubular member, means yieldingly urging said plug toward upward projection beyond the open, upper end of said tubular member, a bi-metal leaf fixed at one end in direct, heat-exchanging contact with the lower end of said plug and with its other end free to move relative to said plug, a switch supported from said plug and having a movable element shiftable, in response to movement of the last-mentioned end of said bi-metal leaf relative to said plug, to open and close said switch, a pair of terminal posts for said switch, a terminal plate, means supporting said plate in a fixed position relative to said tubular member and beneath the lower end of said plug, a pair of electrical contacts carried by said terminal plate and disposed in the path of said terminal posts upon downward movement of said plug, whereby electrical contact between said posts and said contacts will be established, and means for electrically connecting said pair of contacts in such an electric circuit.

3. The device of claim 2 in which said terminal plate is provided with a pair of spaced holes, the means supporting said terminal plate comprising a pair of threaded posts depending from said tubular member, said posts taking through said holes in said terminal plate, each said post being provided with a pair of nuts embracing the opposite sides of said terminal plate and adjustable along said post to shift said terminal plate toward and away from the terminal posts of said switch.

4. In combination with a gas burner which is formed to provide a vessel-supporting surface having an opening therethrough, means for controlling the flow of gas to said burner comprising a tubular member formed of relatively low thermo-conductive material, means for supporting said member in the opening through such vessel-supporting surface with the open, upper end of said member disposed substantially in the plane of said surface, a plug of relatively high, thermo-conductive material reciprocably received in, and largely shielded by, said tubular member, means yieldingly urging said plug toward upward projection beyond the open, upper end of said tubular member, a thermo-responsive element supported from the lower end of said plug with one end in direct, heat-exchanging contact therewith and the other end free to move relative to said plug, a switch supported from said plug and having a movable element shiftable, in response to movement of the last-mentioned end of said thermo-responsive element, to open and close said switch, a pair of terminal posts for said switch supported for movement with said plug, a pair of contact means, means supporting said contact means beneath said plug in the path of movement of said terminal posts, said terminal posts engaging said contact means upon downward movement of said plug, a normally-closed fluid valve, conduit means for connecting such a gas burner to a supply of gas through said valve, electrically driven motor means for opening and closing said valve, and means for electrically connecting said contact means in the energizing circuit of said motor means.

5. The device of claim 4 including a gas pilot for said gas burner, a thermo-responsive switch near said pilot and held closed only while said pilot is burning, said switch being electrically connected in series with said energizing circuit for said motor means.

6. The device of claim 5 including a manually operated fluid valve, conduit means for connecting said fluid valve between the first-mentioned fluid valve and such a gas burner, and conduit means for connecting said manually operated fluid valve between a supply of gas and such a burner, said valve being adjustable between a position in which gas can flow from such supply to such burner through the first-mentioned valve, and a position in which gas can flow from such supply directly to such burner, by-passing said first-mentioned valve.

References Cited in the file of this patent

UNITED STATES PATENTS

| | | |
|---|---|---|
| 1,201,469 | James | Oct. 17, 1916 |
| 1,996,907 | Drake | Apr. 9, 1935 |
| 2,148,407 | Pierson | Feb. 21, 1939 |
| 2,176,647 | Thompson et al. | Oct. 17, 1939 |
| 2,303,012 | Weber | Nov. 24, 1942 |
| 2,399,423 | Bletz | Apr. 30, 1946 |
| 2,520,788 | Wales | Aug. 29, 1950 |
| 2,524,506 | Akeley | Oct. 3, 1950 |
| 2,611,069 | Frazier | Sept. 16, 1952 |

FOREIGN PATENTS

| | | |
|---|---|---|
| 679,868 | Germany | Nov. 6, 1936 |